United States Patent
Tamaru et al.

(10) Patent No.: US 6,416,896 B1
(45) Date of Patent: Jul. 9, 2002

(54) MATERIAL FOR ELECTRODE COMPRISING A NON-WOVEN FABRIC COMPOSED OF A FLUORINE-CONTAINING RESIN FIBER

(75) Inventors: Shinji Tamaru; Katsutoshi Yamamoto; Jun Asano, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/600,719

(22) PCT Filed: Jan. 14, 1999

(86) PCT No.: PCT/JP99/00105

§ 371 (c)(1),
(2), (4) Date: Jul. 20, 2000

(87) PCT Pub. No.: WO99/36980

PCT Pub. Date: Jul. 22, 1999

(30) Foreign Application Priority Data

Jan. 20, 1998 (JP) ............................................. 10-008432

(51) Int. Cl.[7] ................................................. H01M 4/02
(52) U.S. Cl. ......................................... 429/27; 429/42
(58) Field of Search ............................... 429/27, 40–44; 428/365; 442/361, 415

(56) References Cited

U.S. PATENT DOCUMENTS 3,930,094 A * 12/1975 Sampson et al.
4,444,852 A * 4/1984 Liu et al.
5,912,077 A * 6/1999 Tamaru et al.

FOREIGN PATENT DOCUMENTS

| EP | 0580278 A1 | 1/1994 | |
| EP | 0791974 A1 | 8/1997 | |
| JP | 57-30270 | 2/1982 | ............ H01M/4/86 |
| JP | 59-35362 | 2/1984 | ............ H01M/4/86 |
| JP | 6-267555 | 9/1994 | ............ H01M/8/02 |
| JP | 7-105957 | 4/1995 | ............ H01M/4/96 |

OTHER PUBLICATIONS

International Search Report for application PCT/JP99/00105, dated May 11, 1999.

International Preliminary Examination Report dated Mar. 21, 2000 for PCT/JP99/00105.

European Search Report dated Apr. 10, 2001 for EP 99900314.

* cited by examiner

Primary Examiner—Gabrielle Brouillette
Assistant Examiner—Susy Tsang-Foster
(74) Attorney, Agent, or Firm—Sughrue Mion, PLLC

(57) ABSTRACT

A material for electrode which is excellent in electric conductivity, gas permeability, water repellency and chemical resistance and has enhanced handling property, moldability and processability is provided. A gas diffusion electrode for a fuel battery which is obtained by using a non-woven fabric comprising a fluorine-containing resin fiber and electrically conductive fiber as a material for electrode is formed.

9 Claims, 2 Drawing Sheets (a)   (b)   (c)

(d)

MATERIAL FOR ELECTRODE COMPRISING A NON-WOVEN FABRIC COMPOSED OF A FLUORINE-CONTAINING RESIN FIBER

TECHNICAL FIELD

The present invention relates to a novel material for electrode, particularly a material for electrode suitable for a gas diffusion layer of fuel battery.

BACKGROUND ART

An another look has been given to batteries as clean energy sources, and batteries based on various theories have been proposed and developed. For example, fuel batteries giving electric energy by a reaction of hydrogen or hydrocarbon gas as a fuel gas with oxygen are expected as energy sources together with solar batteries.

The fuel batteries basically have a structure having a pair of gas diffusion electrodes comprising a reaction layer (catalyst layer) and gas diffusion layer (electrode layer) with various electrolytes being filled between the reaction layers. A collecting plate is usually disposed at the outside of the gas diffusion layer.

From the point that hydrogen (hydrocarbon) gas is reacted with oxygen gas (air) to give water (steam), the gas diffusion layer requires at least the following characteristics.

(1) Having Gas Permeability

It is necessary for the gas diffusion layer to have a porous structure to give a proper gas diffusion speed.

(2) Having Hydrophobic Property

It is necessary that the gas diffusion layer is hydrophobic so that generated steam is not condensed in the gas diffusion layer and gas diffusion (permeation) is not hindered. In order to make the gas diffusion layer hydrophobic, polytetrafluoroethylene is usually blended.

(3) Having Electric Conductivity

Good electric conductivity is required to take out electric energy. To give electric conductivity, a carbon fiber, carbon whisker or carbon black is usually blended.

Further in order to enhance an efficiency of conversion to electric energy and an energy taking-out efficiency, not only a material but also a shape of the gas diffusion layer is important.

(4) Processability into Various Shapes and Easy Processing are Necessary

As the fuel batteries, there are an alkali type, phosphoric acid type, fused carbonate type, solid polyelectrolyte type, and the like depending on kind of electrolyte. Among them, attention has been drawn to the solid polyelectrolyte type from the points that it has an operation temperature around at 70° to 100° C., a high current density can be obtained, its service life is long, it is free from deterioration due to starting and stopping, starting at low temperature is easy, operation at low load can be made, a precise pressure differential control is not necessary, inexpensive material can be used, it is subject to less corrosion, and there is no poisoning by $CO_2$.

As the gas diffusion layer (electrode) of such a solid polyelectrolyte type fuel battery, there have been proposed one which is produced by kneading a graphite whisker and polytetrafluoroethylene (PTFE) powder with a shearing force being applied thereto to fibrillate the PTFE powder and then hot-pressing a sheet in which the graphite whisker is entangled with the fibrillated PTFE to a sheet for the reaction layer (JP-A-7-23081 1), one which is produced by hot-pressing a sheet-like substrate for the reaction layer to a sheet-like substrate for the gas diffusion layer obtained by mixing a carbon fiber with water-repellent carbon black and PTFE powder by using a porous metal or one obtained by hot-pressing a water-repellent carbon black and PTFE powder to a porous carbon substrate such as a carbon paper (JP-A-7-220734), one which is produced by using a substrate of porous carbon sheet (carbon paper) comprising only a carbonaceous material obtained by impregnating a mass of carbon fibers with a phenolic resin and then carbonating the phenolic resin by heating (JP-A-9-157052), and the like.

However according to the method disclosed in JP-A-7-230811, the PTFE powder is fibrillated but cannot be said to be a so-called fiber, and sufficient entangling with the graphite whisker cannot be obtained. Therefore PTFE must be melted by hot-pressing to be integrated. As described also in JP-A-7-220734, since the hot-pressing destroys the porous structure and gas diffusion passages are broken, gas diffusion ability is lowered.

In order to improve that point, in JP-A-7-220734, hot-pressing is carried out with a porous plate. However a porous structure is not sufficient and also not satisfactory from the viewpoint of strength.

The carbon paper described in JP-A-9-157052 has good porosity but due to carbonization, is wholly fragile and poor in processability.

An object of the present invention is to provide the material for electrode which is excellent in gas permeability (porosity), hydrophobic property, electric conductivity, chemical resistance and further in mechanical strength (flexibility), moldability and processability.

DISCLOSURE OF INVENTION

The present invention relates to the material for electrode comprising a fluorine-containing resin fiber and an electrically conductive fiber, further the material for electrode produced from a non-woven fabric comprising a fluorine-containing resin fiber and an electrically conductive fiber.

In the present invention, the fluorine-containing resin "fiber" does not encompass such a fibrillated PTFE as described in the above-mentioned JP-A-7-230811 which is obtained by applying a shearing force to a PTFE powder to fibrillate it. The fibrillated PTFE has an ability to agglomerate carbon powder particles, whiskers and fibers and further platinum catalyst powder with each other, but cannot give a mechanical strength to the agglomerate. Therefore a molded article of fibrillated PTFE requires a separate substrate for supporting thereof.

In the present invention, the "fluorine-containing resin fiber" can give a sufficient mechanical strength such as tensile strength, elongation strength and bending strength to a molded polymer. Particularly the fiber having a branched structure is preferable for enhancing intermingling property between the fibers to form a molded article.

BEST MODE FOR CARRYING OUT THE INVENTION

In the present invention either of a heat-meltable fluorine-containing resin fiber and non-melt-processable fluorine-containing resin fiber may be used, and both of them may be used together. Example of the non-melt-processable fluorine-containing resin is PTFE.

Examples of the preferred heat-meltable fluorine-containing resin fiber are one or two or more of fibers of tetrafluoroethylene-perfluoro(alkyl vinyl ether) copolymer (PFA), tetrafluoroethylene-hexafluoropropylene copolymer (FEP), ethylene-tetrafluoroethylene copolymer (ETFE), polyvinylidene fluoride (PVdF), polyvinyl fluoride (PVF), polychlorotrifluoroethylene (PCTFE) and ethylene-chlorotrifluoroethylene copolymer (ECTFE).

The fluorine-containing resin fiber can be produced, for example, by the following method.

(1) Method of Tearing and Opening (WO94/23098)

A uniaxially stretched fluorine-containing resin film is torn and opened by using needle blade rolls or combing rolls. When the needle blade rolls are used, a film feeding speed, the number of needles and arrangement of needles are selected, and the film is formed into a fiber at one stage.

The fibers obtained by that method are staple fibers and have a branched structure and in some cases, have a loop and/or a crimp.

It is preferable that uniaxially stretching ratios of PTFE film and heat-meltable fluorine-containing resin film are not less than three times and not less than five times, respectively.

(2) Splitting Method (WO96/10662)

A uniaxially stretched fluorine-containing resin film is split with needle blade rolls to give a film having network structure and then the linkage is cut to give fibers. In order to split the film, the number of needles, the arrangement of needles and a film feeding speed may be adjusted.

The stretching ratio of the fluorine-containing resin may be the same as in the method (1) above.

Fibers obtained by the splitting method are fibers having a branched structure and comparatively uniform shape.

(3) Slitting Method (JP-B-48-8769)

A fluorine-containing resin film is finely slit and then stretched to give monofilaments, followed by crimping and cutting steps to give fibers. Fibers obtained by this method are monofilaments and differ from the fibers of the above (1) and (2).

Particularly preferred fluorine-containing resin fibers to be used in the present invention are those having a branched structure. This is because when they are mixed with electrically conductive fibers to make a non-woven fabric, intermingling property is given by the branches and thus excellent strength is obtained. Further the fibers may have a loop structure or crimps.

Figure 2:
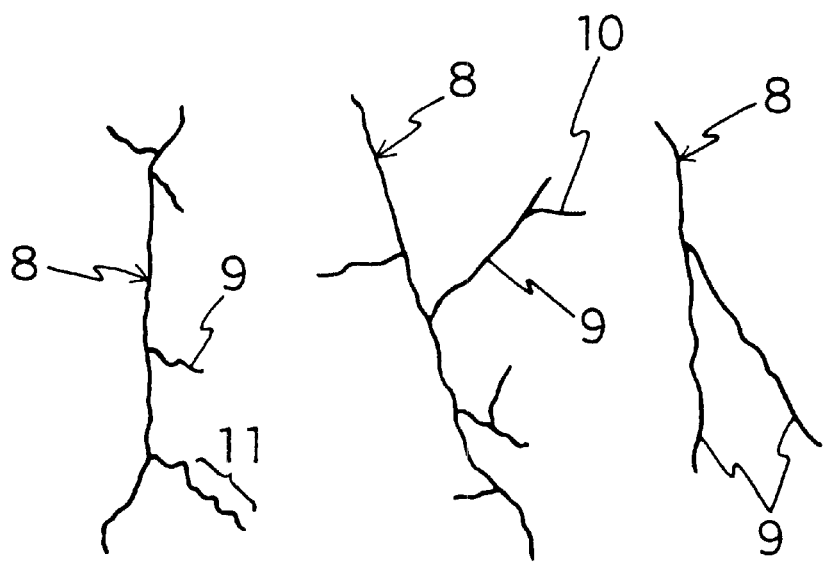
FIG. 2(*a*), (*b*), (*c*) and (*d*) are diagramatic views of fluorine-containing resin fibers to be used in the present invention.
Figure 2:
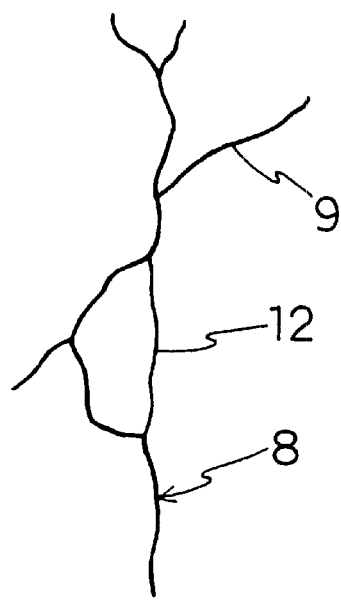

Examples of the branched structure and loop structure are, for instance, those shown in FIG. 2. The fiber (a) has a branched structure comprising a fiber 8 and a plurality of branches 9 coming from the fiber 8. The fiber (b) is a fiber having a branch 9 and further a branch 10 coming from the fiber 9. The fiber (c) is a fiber simply divided into two fibers. The fiber (d) is a fiber having a loop 12. Those structures are only models of the fibers. The number and the length of branches are not particularly limited, but the existence of such branches and loops is an important cause for enhancing intermingling property of the fibers. It is preferable that there is one branch or one loop per 5 cm of the fiber, particularly at least two branches or at least two loops per 5 cm of the fiber.

It is preferable that the fluorine-containing resin fibers to be used in the present invention have a branched structure and/or a loop structure; fineness thereof is 2 to 200 deniers, preferably 2 to 50 deniers, further preferably 2 to 30 deniers, particularly preferably 2 to 15 deniers; the number of crimps is 1 to 15/20 mm; and the figure of a section of the fibers is irregular. It is preferable that the fineness of the fiber including the branches is in the said range, though there is no fibers having the same fineness throughout the fiber. Therefore there is a case where a part of the fibers is out of the above-mentioned range of the fineness.

Also it is preferable that as shown in FIG. 2, the fiber 8 has partly a "crimp" 11. The "crimp" also contributes to enhancement of intermingling property. The preferable number of crimps is 1 to 15/20 mm. According to the process of production of above (1), crimps arise even if no specific crimping process is applied.

The electrically conductive fiber to be used in the present invention imparts electric conductivity to the material for electrode, further to an electrode. Examples thereof are, for instance, a carbon fiber, metal fiber, synthetic fiber coated with metal, and the like.

The carbon fiber can be obtained, for example, by a method of carbonizing and graphitizing an acrylic fiber by heat-treating at high temperature, a method of making petroleum pitch as a starting material into a fiber and then heat-treating at high temperature for carbonization and graphitization, or the like. Examples thereof are TOREKA available from Toray Industries, Ltd., and the like.

Examples of the metal fiber are, for instance, stainless steel fiber, iron fiber, copper fiber, and the like. Particularly stainless steel fiber is preferred. Examples of the synthetic fiber coated with metal are, for instance, an acrylic fiber coated with silver, and the like.

A fiber length is from 2 to 200 mm, preferably from 5 to 150 mm, and a fiber diameter is from 0.2 to 50 $\mu$m, preferably from 5 to 25 $\mu$m. It is preferable that the fiber length and fiber diameter are around the same as those of the fluorine-containing resin fiber from the viewpoint that a uniformly mixed state can be obtained.

In the present invention, a non-woven fabric is produced from the above-mentioned fluorine-containing resin fiber and electrically conductive fiber.

Example of the method for producing the non-woven fabric is as follows.

A weight of a mass of the above-mentioned respective fibers is measured depending on purpose, and the fibers are passed through an opening machine, mixing machine and carding machine to give a web. In order to enhance uniformity of mixing, these steps can also be repeated to give a web.

Then the web is compressed with heating at a temperature of not less than a melting point of the heat-meltable resin. The heating can be carried out by flowing hot air. The compression of the web can be carried out with upper or lower plates, belts or rolls. The compression is usually carried out by controlling a loss due to compression with a limit gauge. Thus a thermal-bonding type non-woven fabric can be produced.

Also entangling of the fibers of the web in the thickness direction thereof can be previously carried out by needle punching or water jetting. This is effective for enhancing electric conductivity. Or there is another means for stitching the web in the directions of its length and width with electrically conductive fibers.

In the present invention, it is important that a thermal-bonding type non-woven fabric can be obtained by using a heat-meltable fluorine-containing resin fiber partly or wholly as the fluorine-containing resin fiber. By making a non-woven fabric of thermal-bonding type, thermo-fusing in addition to mechanical entangling is made and thereby a non-woven fabric having further excellent strength and moldability can be obtained while maintaining porosity.

A proportion of the fluorine-containing resin fiber to the electrically conductive fiber in the non-woven fabric varies depending on various characteristics required for the material for electrode, material of each fiber, etc. A weight ratio of the fluorine-containing resin fiber to the electrically conductive fiber is usually from 1/99 to 99/1, preferably from 5/95 to 40/60. In case of the thermal-bonding type non-woven fabric, a weight ratio of the heat-meltable fluorine-containing resin fiber to the non-melt-processable fluorine-containing resin fiber in the fluorine-containing resin fiber is from 1/99 to 99/1, preferably from 10/90 to 95/5.

Also there is a case where enhancement of electric conductivity in the thickness direction of an electrode is demanded as the material for electrode. In that case, the electric conductivity in the thickness direction can be enhanced by ① increasing a proportion of the electrically conductive fibers, ② previously blending an electrically conductive material (for example, carbon particles, graphite particles, metal particles or the like) to the fluorine-containing resin fiber (for example, a fluorine-containing resin film containing the electrically conductive material is formed into a fiber), ③ sewing (stitching) the non-woven fabric with an electrically conductive fiber (thread), ④ planting or stitching an electrically conductive fiber in the thickness direction of the non-woven fabric, ⑤ dispersing an electrically conductive powder in the thermal-bonding type non-woven fabric and then carrying out thermo-fusing, or ⑥ laminating a plurality of non-woven fabrics, and integrating them, then slicing in the direction at a right angle to the laminating direction.

The material for electrode of the present invention can be used for a part or the whole of various electrodes as it is or by carrying out further processing. Explained below are applications of the material by raising kinds of electrodes, but the applications are not limited to those electrodes.

(1) Gas Diffusion Layer of Electrode of Fuel Battery

As mentioned above, the diffusion layer is demanded to have gas ($H_2$, $O_2$, hydrocarbon) permeability, water repellency and electric conductivity. The material for electrode of the present invention can provide the layer satisfying those requirements by selecting kind and proportion of the fluorine-containing resin fiber and electrically conductive fiber. The material has good intermingling property and the thermal-bonding type material has excellent mechanical strength and is excellent particularly in flexibility, and therefore is excellent in handling property at processing and moldability and can be applied to electrodes having various forms (plate, honeycomb, pleat, cylinder, swirl, etc.).

Further in case of bonding with press to other materials for an electrode (reaction layer and collecting layer), since the material of the present invention has flexibility, it is not broken and productivity is increased. Also since production is easy, production cost can be reduced.

Preferable embodiments are shown as follows.

| (Non-woven fabric) | (Part by weight) |
|---|---|
| ① (A) Fluorine-containing resin fiber (PTFE, PFA, FEP, ETFE, PVdF, PVF, PCTFE, ECTFE) | 50 to 40 parts |
| (B) Electrically conductive fiber (Carbon fiber and metal fibers | 95 to 60 parts |

| (Non-woven fabric) | (Part by weight) |
|---|---|
| such as stainless steel fiber) | |
| (C) Non-woven fabric Weight: 25 to 500 g/cm$^2$ Processing method: Thermal-bonding, needle punching | |
| ② (A) Fluorine-containing resin fiber (PTFE/heat-meltable fluorine-containing resin fiber (weight ratio = 5/95 to 10/90) | 5 to 40 parts |
| (B) Electrically conductive fiber (Carbon fiber) | 95 to 60 parts |
| (C) Non-woven fabric Weight: 25 to 500 g/cm$^2$ Processing method: Thermal-bonding | |

(Production of electrode for fuel battery)

An electrode for fuel battery can be produced through known methods except that the material for electrode of the present invention is used. For example, the electrode can be obtained by carrying platinum or the like on one surface of the above-mentioned non-woven fabric to make a reaction layer, further providing an electrolyte layer on an outer surface thereof and then providing a collecting layer and gas supplying mechanism on another surface of the non-woven fabric.

Examples of physical and electrical characteristics required for the gas diffusion layer are a thickness of 50 to 5,000 $\mu$m, a porosity of 40 to 90%, a gas permeability of 0.1 to 100 cc/cm$^2$/sec, a volume resistivity in the thickness direction of 1 to 0.001 $\Omega$·cm and a volume resistivity in the surface direction of 1 to 0.001 $\Omega$·cm. The present invention satisfies those characteristics. (Kind of fuel battery)

The present invention can be applied to fuel batteries in which an operating temperature thereof is lower than a melting point of the material to be used. Examples of such fuel battery are a solid polyelectrolyte type (operating temperature: 70° to 100° C.), phosphoric acid type (operating temperature: about 170° C. to about 200° C.), and the like.

Figure 1:
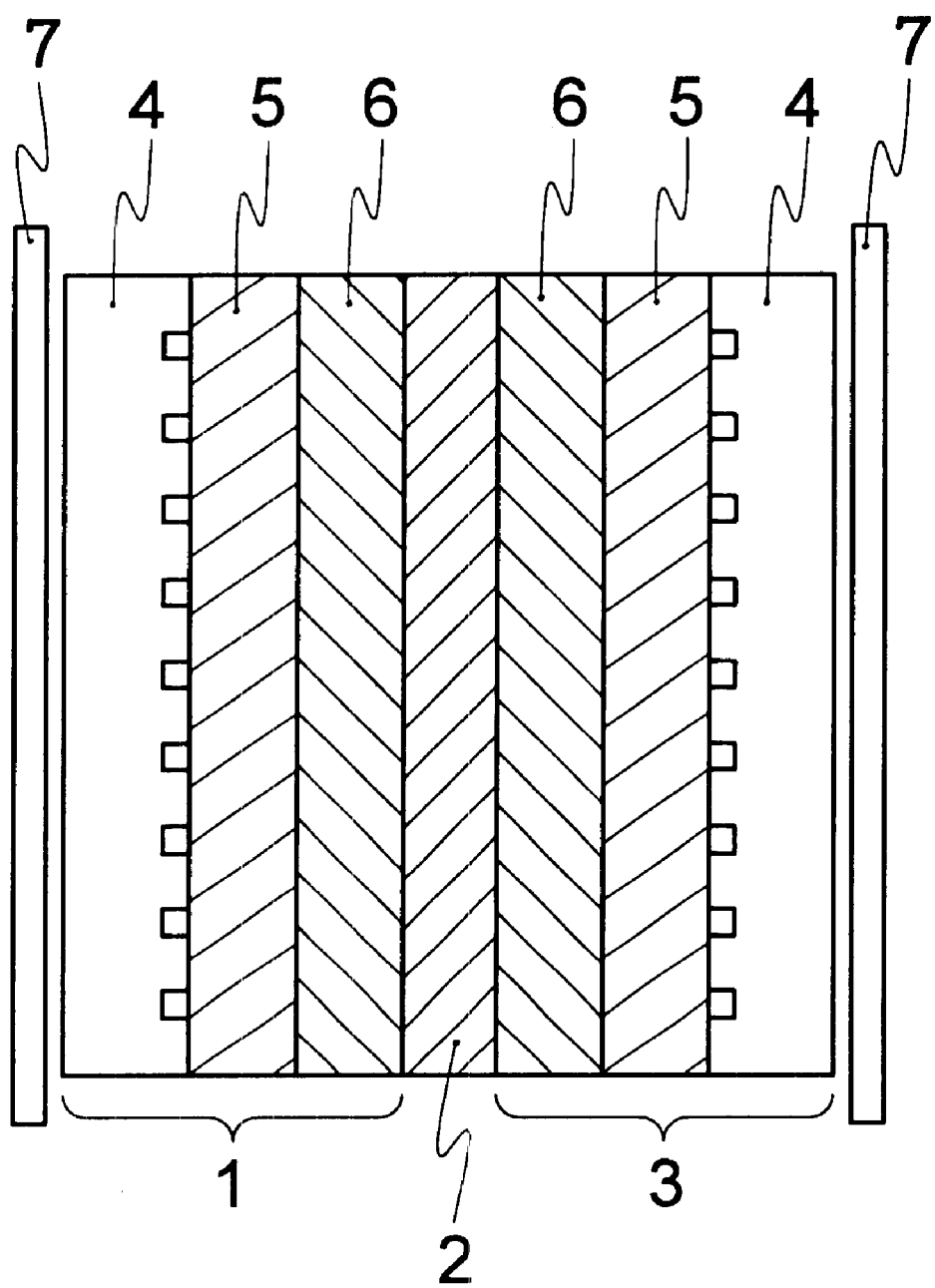
FIG. 1 is a diagrammatic cross-sectional view of a basic structure of fuel battery to which the present invention is applicable.

Though various structures of fuel batteries have been proposed, a structure common to those batteries is basically such that as shown in FIG. 1, a plurality of unit cells comprising an anode electrode 1 (collecting layer 4, gas diffusion layer 5 and reaction layer 6 in order from the outside), electrolyte 2 and cathode electrode 3 (collecting layer 4, gas diffusion layer 5 and reaction layer 6 in order from the outside) are connected through separators 7. Among them, there is a fuel battery in which the separator is used as a collecting layer. In the fuel battery of the present invention, the gas diffusion layers 5 in each of the electrodes 1 and 3 of respective unit cells are made of the above-mentioned material for electrode of the present invention.

(2) Other Electrodes

Electrode at gas generation side of electrolytic chamber, electrode at air suction side of air-zinc battery, etc.

Then examples of the present invention are explained below, but the present invention is not limited to those examples.

EXAMPLE 1

A fluorine-containing resin fiber, a non-woven fabric and a material for electrode were produced under the conditions mentioned below according to the method described in WO96/10668.

Material A [Uniaxially stretched PTFE film (film stretched by 15 times in the longitudinal direction, thickness: 20 μm, width: 75 mm)], Material B [Uniaxially stretched ETFE film (film stretched by 10 times in the longitudinal direction, thickness: 15 μm, width: 50 mm)] and Material C [Carbon fiber (TOREKA available from Toray Industries, Ltd.)] in a weight ratio of 10%, 20% and 70%, respectively were torn and opened with needle blade rolls (diameter of roll at needle tip: 50 mm, outer diameter of roll: 45 mm, pitch of needles on circumference of roll: divided equally into 60 parts, length of roll at the needle-planted part: 250 mm, number of needles in the longitudinal direction: 325) rotating at high speed (peripheral speed ratio to pinch rolls: 30 times) through pinch rolls to give a web having a weight of 200 g/m$^2$ and comprising uniformly mixed Materials A, B and C.

Then the web was put between two metal plates heated to 300° C. (clearance gauge: 0.1 mm) and held at 5 kg/cm$^2$ for two minutes for thermal-bonding the PTFE fiber and carbon fiber with ETFE. Thus a material for electrode comprising a thermal-bonding type non-woven fabric and having a thickness of 105 μm was produced.

Physical properties of the obtained material for electrode were as follows.

Porosity: 70% (A 5 cm square sample sheet is used. When a calculated volume of the sample is assumed to be $V_1$ and an actual volume measured by dipping the sample in isopropanol is assumed to be $V_2$, a porosity of the sample is calculated by $(V_1-V_2)/V_1\times 100$ (%))

Gas permeability: 15 cc/cm$^2$/sec (measured by Frazier method)

Volume resistance in the direction of thickness: 0.5 Ω·cm (measured by using a 1 cm square electrode)

Volume resistance in the direction of surface: 0.1 Ω·cm (measured at 1 cm width×5 cm distance)

Flexibility: A sheet of 1 cm wide is bent by hand along a right angle corner of a jig. The sheet was not broken and there was no change in volume resistance.

Those results satisfy requirements for characteristics required as a gas diffusion layer of a fuel battery.

INDUSTRIAL APPLICABILITY

According to the present invention, the material for electrode being excellent in handling property, moldability and processability and in addition, having excellent electric conductivity, gas permeability, water repellency and chemical resistance can be provided.

What is claimed is:

1. A material for an electrode, the material comprising a thermally bonded non-woven fabric comprising a heat-meltable fluorine-containing resin fiber, polytetrafluoroethylene (PTFE) fiber and electrically conductive fiber, wherein a weight ratio of the heat-meltable fluorine-containing resin fiber to the PTFE fiber is from 1/99 to 99/1.

2. The material for an electrode of claim 1, wherein, each of the heat-meltable fluorine-containing resin fiber and the PTFE fiber has a branched structure.

3. The material for an electrode of claim 1, wherein the heat-meltable fluorine-containing resin fiber is at least one selected from the group consisting of a tetrafluoroethylene-perfluoro(alkyl vinyl ether) copolymer fiber, tetrafluoroethylene-hexafluoropropylene copolymer fiber, ethylene-tetrafluoroethylene copolymer fiber, polyvinylidene fluoride fiber, polyvinyl fluoride fiber, polychlorotrifluoroethylene fiber and ethylene-chlorotrifluoroethylene copolymer fiber.

4. The material for an electrode of claim 1, wherein the electrically conductive fiber is a carbon fiber and/or a metal fiber.

5. An electrode made of the material for an electrode of claim 1.

6. A battery having the electrode of claim 5.

7. An electrode for a fuel battery which has a gas diffusion layer made of the material for an electrode of claim 1.

8. The electrode of claim 7, wherein the gas diffusion layer is in the form of plate, honeycomb, pleat, cylinder or swirl.

9. A fuel battery having the electrode of claim 7.

* * * * *